3,296,212
POLYESTERURETHANE FIBERS
J. W. Britain, New Martinsville, W. Va., assignor to Mobay Chemical Company, Pittsburgh, Pa., a corporation of Delaware
No Drawing. Filed Aug. 28, 1962, Ser. No. 220,053
13 Claims. (Cl. 260—75)

This invention relates to thread forming polyurethane polymers and a method of preparing the same. More particularly, it relates to polyurethane fibers having improved properties with respect to creep and elongation set and to a simplified melt polymerization of preparing such fibers.

Creep is defined as the deformation of a thread when a constant weight is hung from the thread after initial elongation has taken place. Elongation set is defined as the percentage change in the length of the unstressed fiber after the fiber has been initially elongated.

It has been heretofore known to produce polyurethane fibers by incorporating into the molecular structure both hard segments and soft segments. This has been accomplished by a variety of techniques as it has been found that such a structure is necessary to obtain the properties desired. Several of these techniques are to utilize a soft segment such as a high molecular weight polyester or polyether of low crystallinity in conjunction with a polyester or polyether having a high crystallinity. Another method is to combine into a molecular structure a low crystallinity polyester or polyether and urea or urethane groups which form the hard segment of the polymer. This has been accomplished by utilizing the bischloroformate technique of preparing polyurethanes; by reacting the hydroxyl containing soft components, isocyanates and diamines; by utilizing a soft component containing hydroxyl groups with diisocyanate and dihydric phenols and by spinning isocyanate terminated prepolymers into amine or water solutions. These methods produce segmented polymers having both hard and soft segments, however, they suffer disadvantages either in the processing techniques, the resulting properties or both. For example, the processing procedures are cumbersome and involved, the resulting polymers do not exhibit the necessary properties with respect to creep and elongation set and many fabrics made from polyurethane fibers seriously discolor when subjected to standard household bleaching agents such as hypochlorite bleach.

It is therefore an object of this invention to provide improved thread forming polyurethane polymers. It is another object of this invention to provide polyurethane threads having improved properties with respect to creep and elongation set. It is another object of this invention to provide an improved method of making thread forming polyurethane polymers. It is still another object of this invention to provide improved thread forming polyurethane polymers containing both hard and soft segments by a simplified method. It is a further object to provide polyurethane threads which are not substantially discolored in common household bleaches.

The foregoing objects and others which will become apparent from the following description are accomplished in accordance with this invention generally speaking by providing thread forming polyurethane polymers having the structural units represented by the formula:

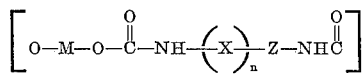

wherein O—M—O is a bivalent radical resulting from removal of the terminal hydrogen atoms from an hydroxyl polyester having a molecular weight of at least about 600 and prepared by the process which comprises reacting a mixture of two or more saturated aliphatic glycols having primary hydroxyl groups and from 2 to 6 carbon atoms in the chain betwen hydroxyl groups with an aliphatic dicarboxylic acid having from 4 to 10 carbon atoms; X is a radical having the formula:

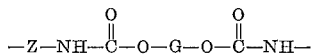

where Z is an aromatic radical and O—G—O is a bivalent radical resulting from removal of the terminal hydrogen atoms from a primary straight chain glycol having from 2 to 10 carbon atoms between hydroxyl groups and $n$ is an integer of at least 2. Thus, the invention contemplates a segmented polyurethane polymer prepared from specific polyesters with an aromatic diisocyanate and a primary glycol where the ratio of the molecules of primary glycol to molecules of polyester employed in preparing the polyurethane by reaction with a diisocyanate is at least 2.

In the formula represented above M represents a polyester of low crystallinity having a molecular weight of at least about 600 and preferably from about 600 to about 5000 and prepared from a mixture of at least two saturated aliphatic glycols having primary hydroxyl groups and from 2 to 6 carbon atoms in the chain between hydroxyl groups such as for example, ethylene glycol, 1,3-propanediol, 2,2-dimethyl-1,3-propanediol, 2,2-diethyl-1,3-propanediol, 2-ethyl-2-butyl-1,3-propanediol, 1,4-butanediol, 1,5-pentanediol, 1,6-hexanediol, 2,4-cyclohexanedimethylol and the like; and one or more aliphatic dicarboxylic acids having from 4 to 10 carbon atoms such as, for example, succinic acid, glutaric acid, adipic acid, pimelic acid, suberic acid, azelaic acid, sebacic acid and the like. For best results, a polyester having a molecular weight of from about 2500 to about 3500 is preferred.

The radical represented by Z above may be any aromatic radical resulting from removal of the isocyanate groups from an aromatic diisocyanate such as, for example, 2,4-tolylenediisocyanates, isomeric mixtures of 2,4- and 2,6-tolylenediisocyanate, 4,4'-diphenyl methane diisocyanate, isocyanates having the formula:

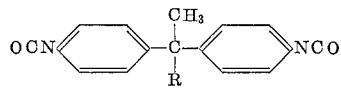

where R is hydrogen or methyl, 1,5-naphthalene diisocyanate, diphenylene diisocyanate and the like.

The radical represented by G in the formula above is a bivalent radical resulting from the removal of the terminal hydrogen atoms from a primary straight chain aliphatic glycol having from 2 to 10 carbon atoms and preferably from 2 to 6 carbon atoms in the chain between hydroxyl groups such as, for example, 1,4-butanediol, 1,6-hexanediol, 1,3-propanediol, ethylene glycol, 1,5-pentanediol, 1,7-heptanediol, 1,8-octanediol, 1,9-nonanediol and 1,10-decanediol. It is preferred that the radical represented by G has from 2 to 6 carbon atoms between hydroxyl groups with no branches in the chain. The value $n$ is at least two and thus the ratio of glycol molecules (G) to polyester molecules (M) is at least 2 and can be from 2 to 8 and preferably from about 3 to 5.

In a preferred embodiment the polyester represented by M has a molecular weight of about 3000, Z is an aromatic radical obtained by removal of the NCO groups from 4,4'-diphenylmethane diisocyanate, G is a radical obtained by removal of the hydrogen atoms from 1,4-butanediol and $n$ has a value of 4.

The thread forming polyurethane polymers of this invention are prepared by simplified techniques. One method is to react the polyester with a sufficient excess amount of the diisocyanate to prevent chain extension. Thus, the reaction mixture will contain a polyester having terminal —NCO groups with an additional quantity of unreacted isocyanate. To this reaction mixture is added a sufficient quantity of a chain extending agent represented by G in the formula above to obtain the desired molecular weight of the hard segment ${X}$. This value is determined by the amount of unreacted isocyanate and the reaction mixture and by the desired final —NCO to OH ratio which should be from about 1.02 to about 1.08. Another method of preparation is to add all 3 reaction components simultaneously. That is, the polyester, the aromatic diisocyanate and the chain extending agent. After the reaction components have been combined by any suitable mixing device, the components are cast into a suitable mold wherein they are maintained at a temperature of from about 80°–135° C. for from about 8 to about 30 minutes. At this time, the reaction mixture is permitted to cool to room temperature whereupon solidification results. In a preferred embodiment, a catalytic amount of a suitable catalyst such as, for example, ferric acetyl acetonate is added to the reaction mixture. The amount of the catalyst can vary from about 0.01% to about 0.10% and is preferably about 0.03% of the weight of the chain extender used.

After the reaction mixture has solidified, the particle size is reduced by any suitable technique such as chopping or grinding and the material is extruded through a die of the desired diameter. The resulting extrusion is then drawn to the desired ultimate denier.

The invention is further illustrated by the following example in which parts are by weight unless otherwise specified.

Example 1

To about 100 parts of an hydroxyl terminated polyester having a molecular weight of about 2000, an hydroxyl number of about 56 and an acid number less than 2, prepared by reacting about one mol of ethylene glycol, one mol of 1,4-butanediol, and 1.6 mols of adipic acid are added 40 parts of 4,4'-diphenylmethane diisocyanate and about 9.2 parts of 1,4-butanediol so the ratio of isocyanate groups to active hydrogen groups in the mixture before reaction is about 1.04. The butanediol contains 0.03 percent ferric acetyl acetonate which promotes the isocyanate-hydroxyl reaction. Each of the reaction components before combining are at a temperature of about 60° C. After mixing the reaction mixture is cast into a suitable mold which has been treated with a mold release agent, the temperature is maintained at from about 80° C. to about 110° C. for about 15 to 30 minutes, and then cooled to room temperature. The material is then removed from the mold, cut and ground. This ground material may then be extruded and pelletized or diced into small pellets having a diameter of about ⅛ inch. This material has a ratio of glycol molecules to polyester molecules of about 2.

The pelletized polyurethane is melt extruded through a die of the desired diameter by means of a heated screw extruder and the melted extrudate is drawn down from the tip of the die to the desired size. The thread is then stretched 50% while cold and heat treated at about 110° C. for about 18 hours. This thread exhibits the following physical properties:

| Elongation | 100% | 200% | 300% | 400% |
|---|---|---|---|---|
| Stress at 30° C. in grams/denier | 0.040 | 0.065 | 0.104 | 0.175 |
| Percent stress decay at 30° C. after 40 hours stress at constant elongation | 20 | 21 | 23 | 30 |
| Percent set after 72 hours constant stress at 30° C. and 10 minutes relaxation at 30° C. | | 0.050 gram/denier, 18 0.075 gram/denier, 24 | | |

Example 2

To about 100 parts of the polyester of Example 1 is added about 30 parts of 4,4'-diphenylmethane diisocyanate and about 5 parts of 1,4-butanediol so that the isocyanate groups of the unreacted mixture are about 1.04 times the amount of reactive hydrogen groups and the ratio of glycol molecules to polyester molecules is about 1.1. The butanediol contains 0.03 percent of ferric acetyl acetonate. These components before mixing are maintained at a temperature of about 60° C. and after mixing are poured into a suitable mold which has been treated with a mold release agent and held at a temperature of from about 130° to about 135° C. for about 15 minutes. After this heating step the product has a putty-like consistency. The material is cooled to room temperature and reduced in particle size and pelletized as in Example 1. The polymer is then melt extruded and drawn from the belt into a thread of the desired size.

The thread is then stretched 50 percent while cold and then heat treated at 110° C. for about 18 hours and exhibits the following properties:

| Elongation | 100% | 200% | 300% | 400% |
|---|---|---|---|---|
| Stress at 30° C. grams/denier | 0.019 | 0.030 | 0.056 | 0.095 |
| Percent stress decay at 30° C. after 40 hours stress at constant elongation | 53 | 46 | 59 | 69 |
| Percent set after 72 hours constant stress at 30° C. and 10 minutes relaxation at 30° C. | | 0.050 grams/denier, 42 0.075 grams/denier, 55 | | |

By comparing the properties exhibited by the thread of Example 1 with those of Example 2, it can be readily observed that the threads within the scope of the invention are greatly superior to those without the invention especially with regard to set and creep. Also, the stress is much better.

Example 3

To about 100 parts of a hydroxyl polyester having a molecular weight of about 3000, and hydroxyl number of about 37 and an acid number of less than 2, prepared by reacting about 1 mol of ethylene glycol, 1 mol of 1,4-butanediol and 1.75 mols of adipic acid are added about 40 parts of 4,4'-diphenylmethane diisocyanate and 10.6 parts of 1,4-butanediol. The butanediol contains 0.03% of ferric acetyl acetonate which promotes the isocyanate-hydroxyl reaction. These reaction components have a ratio of isocyanate groups to active hydrogen groups of 1.05. Each of the components before combining are at a temperature of about 60° C. After mixing, the reaction mixture is cast into a suitable mold which has been treated with a mold release agent, the temperature is maintained at from about 80° C. to about 110° C. for about 15 minutes, and then cooled to room temperature. The material is then removed from the mold, cut and ground. This ground material is extruded through a die of the desired diameter by means of a heated screw extruder and the melted extrudate is drawn down from the tip of the die to the desired size. This material has a ratio of glycol molecules to polyester molecules of about 4. The thread thus formed is stretched 50% while cold and then heat treated at 110° C. for 18 hours. These threads exhibit the following physical properties:

| Elongation | 100% | 200% | 300% | 400% |
|---|---|---|---|---|
| Stress at 30° C. in grams/denier | 0.046 | 0.065 | 0.102 | 0.185 |
| Percent stress decay at 30° C. after 40 hours stress at constant elongation. | 22 | 20 | 23 | 28 |
| Percent set after 72 hours constant stress at 30° C. and 10 minutes elongation at 30° C. | 0.050 gram/denier, 12 | | | |
| | 0.075 gram/denier, 15 | | | |

*Example 4*

To about 100 parts of an hydroxyl polyester having a molecular weight of about 3000, and hydroxyl number of about 37 and an acid number of less than 2, prepared by reacting 1 mol of ethylene glycol, 1 mol of neopentyl glycol and 1.75 mols of adipic acid are added about 40 parts of 4,4'-diphenylmethane diisocyanate and 7.4 parts of ethylene glycol so the ratio of isocyanate groups to active hydrogen groups is 1.04 for the unreacted mixture. The ethylene glycol contains 0.03% ferric acetyl acetonate which promotes the isocyanate-hydroxyl reaction. Each of the components before combining are at a temperature of about 60° C. After mixing the reaction mixture is cast into a suitable mold which has been treated with a mold release agent. The temperature is maintained at from about 80° C. to about 110° C. for about 15 minutes, and then cooled to room temperature. The material is then removed from the mold, cut and ground. The ground material is extruded through a die of the desired diameter by means of a heated screw extruder and the melted extrudate is drawn down from the tip of the die to the desired size. The cooled fibers are then flexed at elongation of 2 to 7 times in order to impart orientation and produce a product with the desired combination of tenacity, modulus, elongation, elasticity and lowest set properties.

*Example 5*

To about 100 parts of an hydroxyl polyester having a molecular weight of about 3000, and an hydroxyl number of about 37 and an acid number of less than 2, prepared by reacting 1 mol of ethylene glycol, 1 mol of butanediol, 0.87 mol of adipic acid, and 0.87 mol of azelaic acid are added about 40 parts of 4,4'-diphenylmethane diisocyanate and about 8.9 parts of 1,3-propanediol so the ratio of isocyanate groups to active hydrogen groups is 1.05 for the unreacted mixture. The 1,3-propanediol contains 0.03 percent ferric acetyl acetonate which promotes the isocyanate-hydroxyl reaction. Each of the components before combining are at a temperature of about 60° C. After mixing the reaction mixture is cast into a suitable mold which has been treated with a mold release agent, the temperature is maintained at from about 80° C. to about 110° C. for about 15 minutes, and then cooled to room temperature. The material is then removed from the mold, cut and ground. This ground material is extruded through a die of the desired diameter by means of a heated screw extruder and the melted extrudate is drawn down from the tip of the die to the desired size. The cooled fibers are then flexed at elongation of 2 to 7 times in order to impart orientation and produce a product with the desired combination of tenacity, modulus, elongation, elasticity and lowest set properties.

*Example 6*

To about 100 parts of an hydroxyl polyester having a molecular weight of about 2000 and an hydroxyl number of 56 and an acid number of less than 2, prepared by reacting 1 mol of 1,4-butanediol, 1 mol of neopentyl glycol, and 1.6 mols of adipic acid are added about 40 parts of 4,4'-diphenylmethane diisocyanate and about 12.3 parts of 1,6-hexanediol so the ratio of isocyanate groups to active hydrogen groups is 1.04 for the unreacted mixture. The 1,6-hexanediol contains 0.03 percent ferric acetyl acetonate which promotes the isocyanate-hydroxyl reaction. Each of the reaction components before combining are at a temperature of about 60° C. After mixing the reaction mixture is cast into a suitable mold which has been treated with a mold release agent, the temperature is maintained at from about 80° C. to about 110° C. for about 15 to 30 minutes, and then cooled to room temperature. The material is then removed from the mold, cut and ground. This ground material may then be extruded and pelletized or diced into small pellets having a diameter of about ⅛ inch.

This material has a ratio of glycol molecules to polyester molecules of about 2. The pelletized polyurethane is melt extruded through a die of the desired diameter by means of a heated screw extruder and the melted extrudate is drawn down from the tip of the die to the desired size. The cooled fibers are then flexed at elongation of 2 to 7 times in order to impart orientation and produce a product with the desired combination of tenacity, modulus, elongation, elasticity and lowest set properties.

*Example 7*

To about 100 parts of an hydroxyl polyester having a molecular weight of about 3000, and an hydroxyl number of 37 and an acid number of less than 2, prepared by reacting 1 mol of neopentyl glycol, ⅓ mol of 1,4-dimethylol cyclohexane, ⅔ mol of 1,6-hexanediol, and 1.75 mols of adipic acid and are added about 40 parts of 4,4'-diphenylmethane diisocyanate and about 10.6 parts of 1,4-butanediol so the ratio of isocyanate groups to active hydrogen groups is 1.05 for the unreacted mixture. The 1,4-butanediol contains 0.03% ferric acetyl acetonate which promotes the isocyanate hydroxyl reaction. Each of the components before combining are at a temperature of about 60° C. After mixing the reaction mixture is cast into a suitable mold which has been treated with a mold release agent, the temperature is maintained at from about 80° C. to about 110° C. for about 15 minutes, and then cooled to room temperature. The material is then removed from the mold, cut and ground. This ground material is extruded through a die of the desired diameter by means of a heated screw extruder and the melted extrudate is drawn down from the tip of the die to the desired size. The cooled fibers are then flexed at elongations of 2 to 7 times in order to impart orientation and produce a product with the desired combination of tenacity, modulus, elongation, elasticity and lowest set properties.

*Example 8*

To about 100 parts of an hydroxyl terminated polyester having a molecular weight of about 2000, and an hydroxyl number of about 56 and an acid number of less than 2, prepared as in Example 1, are added about 56 parts of 2,4-tolylene diisocyanate and about 6.34 parts of ethylene glycol so that the ratio of isocyanate groups to active hydrogen groups in the mixture before reaction is about 1.04. The ethylene glycol contains 0.03% ferric acetyl acetonate which promotes the isocyanate hydroxyl reaction. Each of the reaction components before combining are at a temperature of about 60° C. After mixing, the reaction mixture is cast into a suitable mold which has been treated with a mold release agent, the temperature is maintained at from about 80° C. to about 110° C. for about 15 to 30 minutes, and then cooled to room temperature. The material is then removed from the mold, cut and ground. This ground material may then be extruded and pelletized or diced into small pellets having a diameter of about ⅛ inch.

This material has a ratio of glycol molecules to polyester molecules of about 5.

It is of course to be understood that any polyester utilizing the reactants set forth above, any of the diisocyanates set forth above and any of the chain extenders set forth above may be used throughout the working examples for those specifically used therein. Further, it is to be understood that pigments, ultra violet absorbers, optical brighteners and the like may be included in the finished threads to impart beneficial results known for such additives.

Although the invention has been described in considerable detail for the purpose of illustration, it is to be understood that variations can be made by those skilled in the art without departing from the spirit of the invention and scope of the claims.

What is claimed is:

1. A thread forming polyurethane polymer which comprises structural units having the formula:

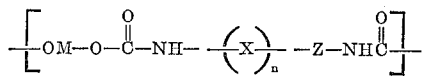

wherein O—M—O is a bivalent radical resulting from removal of the terminal hydrogen atoms from an hydroxyl polyester having a molecular weight of at least about 600 and prepared by the process which comprises reacting a mixture of at least two saturated aliphatic glycols having primary hydroxyl groups and from 2 to 6 carbon atoms in the chain between hydroxyl groups with a difunctional aliphatic dicarboxylic acid having from 4 to 10 carbon atoms; X is a radical having the formula:

$$[-Z-NH-\overset{O}{\underset{\|}{C}}-O-G-O-\overset{O}{\underset{\|}{C}}-NH-]$$

wherein Z is an aromatic radical and O—G—O is a bivalent radical resulting from the removal of the terminal hydrogen atoms from a primary straight chain aliphatic diol having from 2 to about 10 carbon atoms between hydroxyl groups and $n$ is at least 2, the ratio of Z to the sum of M and G being from about 1.02 to about 1.08.

2. A thread forming polyurethane polymer which comprises structural units having the formula:

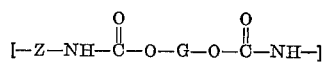

wherein O—M—O is a bivalent radical resulting from removal of the terminal hydrogen atoms from an hydroxyl polyester having a molecular weight of at least about 600 and prepared by the process which comprises reacting a mixture of at least two saturated aliphatic glycols having primary hydroxyl groups and from 2 to 6 carbon atoms in the chain between hydroxyl groups with a difunctional aliphatic dicarboxylic acid having from 4 to 10 carbon atoms; X is a radical having the formula:

$$[-Z-NH-\overset{O}{\underset{\|}{C}}-O-G-O-\overset{O}{\underset{\|}{C}}-NH-]$$

wherein Z is an aromatic radical and O—G—O is a bivalent radical resulting from the removal of the terminal hydrogen atoms from a primary straight chain aliphatic diol having from about 2 to about 10 carbon atoms between hydroxyl groups and $n$ is from about 2 to about 8, the ratio of Z to the sum of M and G being from about 1.02 to about 1.08.

3. A thread forming polyurethane polymer which comprises structural units having the formula:

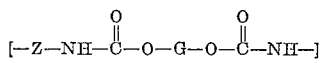

wherein O—M—O is a bivalent radical resulting from removal of the terminal hydrogen atoms from an hydroxyl polyester having a molecular weight of at least about 600 and prepared by the process which comprises reacting a mixture of at least two saturated aliphatic glycols having primary hydroxyl groups and from 2 to 6 carbon atoms in the chain between hydroxyl groups with a difunctional aliphatic dicarboxylic acid having from 4 to 10 carbon atoms; X is a radical having the formula:

$$[-Z-NH-\overset{O}{\underset{\|}{C}}-O-G-O-\overset{O}{\underset{\|}{C}}-NH-]$$

wherein Z is an aromatic radical and O—G—O is a bivalent radical resulting from the removal of the terminal hydrogen atoms from a primary straight chain aliphatic diol having 2 to 10 carbon atoms between hydroxyl groups and $n$ is from 3 to 5, the ratio of Z to the sum of M and G being from about 1.02 to about 1.08.

4. A thread forming polyurethane polymer which comprises structural units having the formula:

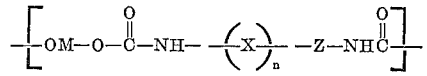

wherein O—M—O is a bivalent radical resulting from removal of the terminal hydrogen atoms from an hydroxyl polyester having a molecular weight of from about 600 to about 5000 and prepared by the process which comprises reacting a mixture of at least two saturated aliphatic glycols having primary hydroxyl groups and from 2 to 6 carbon atoms in the chain between hydroxyl groups with a difunctional aliphatic dicarboxylic acid having from 4 to 10 carbon atoms; X is a radical having the formula:

$$[-Z-NH-\overset{O}{\underset{\|}{C}}-O-G-O-\overset{O}{\underset{\|}{C}}-NH-]$$

wherein Z is an aromatic radical and O—G—O is a bivalent radical resulting from the removal of the terminal hydrogen atoms from a primary straight chain aliphatic diol having 2 to 10 carbon atoms between hydroxyl groups and $n$ is from 2 to 8, the ratio of Z to the sum of M and G being from about 1.02 to about 1.08.

5. A thread forming polyurethane polymer which comprises structural units having the formula:

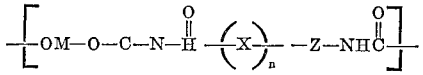

wherein O—M—O is a bivalent radical resulting from removal of the terminal hydrogen atoms from an hydroxyl polyester having a molecular weight of at least about 600 and prepared by the process which comprises reacting a mixture of at least two saturated aliphatic glycols having primary hydroxyl groups and from 2 to 6 carbon atoms in the chain between hydroxyl groups and being substantially free of branches with a difunctional aliphatic dicarboxylic acid having from 4 to 10 carbon atoms; X is a radical having the formula:

wherein Z is an aromatic radical and O—G—O is a bivalent radical resulting from the removal of the terminal hydrogen atoms from a primary straight chain aliphatic diol having 2 to 10 carbon atoms between hydroxyl groups and $n$ is from 2 to 8, the ratio of Z to the sum of M and G being from about 1.02 to about 1.08.

6. A thread forming polyurethane polymer comprising structural units having the formula:

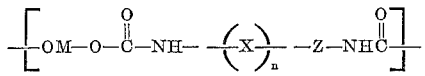

where O—M—O is a bivalent radical resulting from removal of the terminal hydrogen atoms from an hydroxyl polyester having a molecular weight of at least about 600 and prepared by the process which comprises reacting a mixture of at least two members selected from the group consisting of ethylene glycol, 1,3-propanediol, neopentylglycol, 2,2-diethyl-1,3-propanediol, 2-ethyl-2-butyl-1,3-propanediol, 1,4-butanediol, 1,5-pentanediol, 1,6-hexanediol and 2,4-cyclohexanedimethylol with a difunctional aliphatic dicarboxylic acid having from 4 to 10 carbon atoms; X is a radical having the formula:

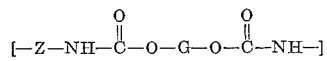

where Z is an aromatic radical and O—G—O is a bivalent radical resulting from removal of the terminal hydrogen atoms from a primary straight chain aliphatic diol having from 2 to 10 carbon atoms between hydroxyl groups and $n$ is from about 2 to about 8, the ratio of Z to the sum of M and G being from about 1.02 to about 1.08.

7. A thread forming polyurethane polymer comprising structural units having the formula:

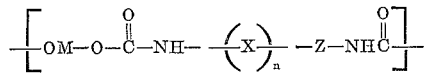

where O—M—O is a bivalent radical resulting from the removal of the terminal hydrogen atoms from an hydroxyl polyester having a molecular weight of from about 2500 to about 3500 and prepared by the process which comprises reacting a mixture of ethylene glycol and 1,4-butanediol with adipic acid; X is a radical having the formula:

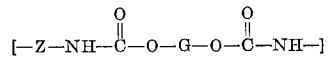

where Z is

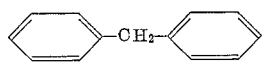

and G is

$(CH_2)_4$ and $n$ is about 4, the ratio of Z to the sum of M and G being from about 1.02 to about 1.08

8. A thread forming polyurethane polymer comprising structural units having the formula:

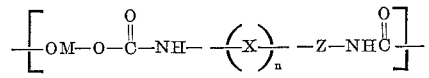

where O—M—O is a bivalent radical resulting from the removal of the terminal hydrogen atoms from an hydroxyl polyester having a molecular weight of about 2000 and prepared by the process which comprises reacting a mixture of ethylene glycol and neopentyl glycol with adipic acid; X is a radical having the formula:

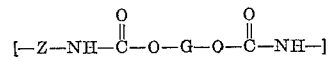

where Z is

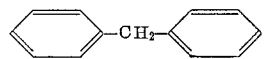

and G is

$(CH_2)_4$ and $n$ is about 2, the ratio of Z to the sum of M and G being from about 1.02 to about 1.08.

9. A thread forming polyurethane polymer comprising structural units having the formula:

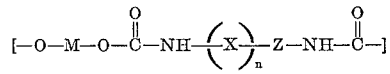

where O—M—O is a bivalent radical resulting from the removal of the terminal hydrogen atoms from an hydroxyl polyester having a molecular weight of about 3000 and prepared by the process which comprises reacting a mixture of 1,4-butanediol and neopentyl glycol with adipic acid; X is a radical having the formula:

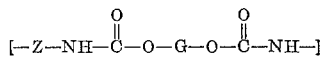

where Z is

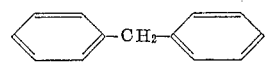

and G is

$(CH_2)_4$ and $n$ is about 4, the ratio of Z to the sum of M and G being from about 1.02 to about 1.08.

10. A thread forming polyurethane comprising structural units having the formula:

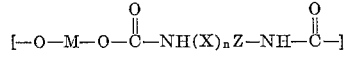

where O—M—O is a bivalent radical resulting from the removal of the terminal hydrogen atoms from an hydroxyl polyester having a molecular weight of about 2000 and prepared by the process which comprises reacting a mixture of 1,6-hexanediol and neopentyl glycol with adipic acid; X is a radical having the formula:

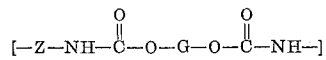

where Z is

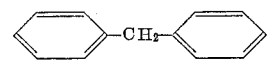

and G is

$(CH_2)_4$ and $n$ is about 2, the ratio of Z to the sum of M and G being from about 1.02 to about 1.08.

11. A thread forming polyurethane polymer comprising structural units having the formula

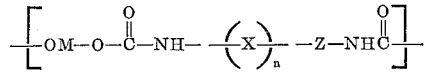

where O—M—O is a bivalent radical resulting from the removal of the terminal hydrogen atoms from an hydroxyl polyester having a molecular weight of about 3000 and prepared by the process which comprises reacting a mixture of 1,4-butanediol and 1,6-hexanediol with adipic acid; X is a radical having the formula:

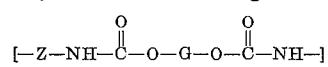

where Z is

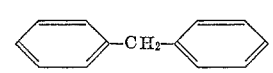

and G is

$(CH_2)_4$ and $n$ is 4, the ratio of Z to the sum of M and G being from about 1.02 to about 1.08.

12. A process for the preparation of thread forming polyurethane polymers which comprises mixing an hydroxyl polyester having a molecular weight of at least about 600 and prepared by the process which comprises reacting a mixture of at least two saturated aliphatic glycols having primary hydroxyl groups and from 2 to 6 carbon atoms in the chain between hydroxyl groups and an aliphatic dicarboxylic acid having from 4 to 10 carbon atoms with an aromatic diisocyanate and a saturated straight chain aliphatic primary diol having from 2 to 10 carbon atoms between hydroxyl groups, said primary diol being present in an amount such that the molecular ratio of said primary diol to said polyester is at least 2, said diisocyanate being present in an amount such that the NCO to OH ratio is from about 1.02 to 1.08 casting the reaction mixture into a mold and permitting the cast material to solidify.

13. A process for the preparation of thread forming polyurethane polymers which comprises mixing an hydroxyl polyester having a molecular weight of at least about 600 and prepared by the process which comprises reacting a mixture of at least two saturated aliphatic glycols having primary hydroxyl groups and from 2 to 6 carbon atoms in the chain between hydroxyl groups and an aliphatic dicarboxylic acid having from 4 to 10 carbon atoms with an aromatic diisocyanate, a saturated straight chain aliphatic primary diol having from 2 to 10 carbon atoms between hydroxyl groups and from about 0.01% to about 0.10% by weight based on its weight of said saturated straight chain aliphatic primary diol, of ferric acetyl acetonate, said primary diol being present in an amount such that the molecular ratio of said primary diol to said polyester is at least 2, said diisocyanate being present in an amount such that the NCO to OH ratio is from about 1.02 to 1.08 casting the reaction mixture into a mold and permitting the cast material to solidify.

References Cited by the Examiner
UNITED STATES PATENTS

| | | | |
|---|---|---|---|
| 2,621,166 | 12/1952 | Schmidt et al. | 260—75 |
| 2,871,218 | 1/1959 | Schollenberger | 260—75 |
| 2,897,181 | 7/1959 | Windemuth et al. | 260—75 |
| 2,953,839 | 9/1960 | Kohrn et al. | 260—77.5 |
| 3,165,566 | 1/1965 | Murphy et al. | 260—75 |

LEON J. BERCOVITZ, *Primary Examiner.*

J. J. KLOCKO, *Assistant Examiner.*